United States Patent Office 2,717,880
Patented Sept. 13, 1955

2,717,880

ALKYL PHENOL EMULSIONS AND PROCESS FOR PREPARING THE SAME

Robert D. Sullivan, Concord, Calif., assignor to Shell Development Company, Emeryville, Calif., a corporation of Delaware No Drawing. Application September 7, 1951,
Serial No. 245,640

10 Claims. (Cl. 252—311)

This invention relates to the provision of stable aqueous emulsions of alkyl phenol compounds.

The alkyl phenols, wherein at least one of the hydrogen atoms of the phenyl nucleus is replaced by an alkyl group, are employed in a wide variety of applications. Many, particularly the polyalkyl phenols, are useful antioxidants and function as such in various paints and lubricants, for example, as well as in papers, cardboards and other materials employed in wrapping foodstuffs. For many of these applications it is necessary that the alkyl phenol be present in the form of an emulsion at the time of its introduction into the material to be protected against oxidative attack. However, while such emulsions, particularly those employing water as the continuous phase, can readily be prepared, it has been found that the alkyl phenol particles present in the emulsion quickly coalesce and settle out due to crystal growth of the individual alkyl phenol particles present. Many attempts have been made to stabilize these emulsions by adding various emulsifying agents as well as those compounds which are known to exert an emulsion-stabilizing action generally. However, these attempts have been unsuccessful, and no satisfactory method has as yet been provided whereby aqueous emulsions of alkyl phenols can be effectively stabilized.

It is therefore an object of the present invention to provide aqueous emulsions of alkyl phenol compounds which are entirely stable and can be used with success wherever the alkyl phenol is to be incorporated in a given material in the form of an emulsion. A more particular object of this invention is to provide stable aqueous emulsions of polyalkylated phenols, and more especially of the 2,4,6-trialkylphenols which form the most important class of phenolic antioxidants. The nature of other objects of the invention will be apparent from a consideration of the descriptive portion to follow.

It has now been discovered that emulsions of alkyl phenols in an aqueous dispersing medium can be stabilized by incorporating therein a minor amount of a water-insoluble, heat-fusible solid selected from the group consisting of the micro-crystalline waxes, ester gum and the high molecular weight polymers of olefinically unsaturated organic compounds, including polystyrene, styrene-butadiene copolymers, polyethylene, polyisobutylene and polyvinylacetate. Of these various emulsion stabilizing agents, the micro-crystalline waxes are preferred.

The process of the present invention can be practiced with good effect in the case of any alkyl phenol. Representative emulsifiable compounds of this type are the various cresols, o-, m- and p-ethyl phenol, p-propyl phenol, p-isopropyl phenol, p-tertiarybutyl phenol, 2,4-dimethyl phenol, 2-methyl-4-tertiarybutyl phenol, 2-tertiarybutyl-4-methyl phenol, 2-methyl-4-dodecyl phenol, 2,4-ditertiarybutyl phenol, 2,6-diethyl phenol, 2-methyl-6-tertiarybutyl phenol, 2,4,6-trimethyl phenol, 2,6-diethyl-4-methyl phenol, 2,4,6-triethyl phenol, 2,6-dipropyl-4-methyl phenol, 2,4,6-tripropyl phenol, 2,6-diethyl-4-tertiarybutyl phenol, 2-tertiarybutyl-4,6-dimethyl phenol, 2,4,6-tritertiarybutyl phenol, 2,4,6-triisopropyl phenol, 2,4,6-tritertiaryamyl phenol, 2-tertiarybutyl-4,6-ditertiaryamyl phenol, 2-tertiaryamyl-4,6-dimethyl phenol, 2-isopropyl-4,6-dimethyl phenol, 4-methyl-2,6-ditertiaryamyl phenol, 2,6-ditertiarybutyl-4-tertiaryamyl phenol, bis-(2-hydroxy-3-tert.-butyl-5-methyl phenyl)-methane, bis-(2-hydroxy-3,5-dimethyl phenyl)-methane and bis-(2-hydroxy-3-tert.-butyl-5-methyl phenyl)-sulfide. However, particularly good results have been obtained in the stabilization of aqueous emulsions of the polyalkyl phenols (which term also includes the bis(polyalkylphenol) alkanes and sulfides), many examples of which have been given above. These polyalkyl phenols are prepared by conventional processes, the usual method being to heat a phenol or an alkylated phenol derivative such as o-, m- or p-cresol with an alkene in the presence of an acidic condensing agent such as sulfuric acid, phosphoric acid, hydrogen chloride or ferric chloride, the alkene attaching to one or more of the carbon atoms of the phenyl nucleus, depending on the reactant proportions employed.

The micro-crystalline waxes which can be employed in stabilizing the alkyl phenol emulsions are derived from petroleum and can be defined as solid hydrocarbon mixtures having plastic properties and a molecular weight averaging higher than paraffin wax which are separated from the parts of crude petroleum commonly designated as heavy lubricating and cylinder oil stocks, they having a minimum kinematic viscosity of 5.75 centistokes at 210° F. and a maximum penetration of 60 at 77° F., as determined by A. S. T. M. method D5–25. Representative waxes of this character are, for example, Petrolite 1035 and Petrosene A wax, both manufactured and sold by the Petrolite Corporation, Be Square White wax, manufactured and sold by the Bareco Oil Company, Pennsylvania Microwax, manufactured and sold by the Quaker State Oil Refining Corporation, and refined 145/150 MX wax, as manufactured and sold by Shell Oil Company.

As indicated above, other stabilizing agents than the micro-crystalline waxes are ester gum (a glycerol ester of rosin), high molecular weight homopolymers of styrene and copolymers of this material with butadiene (Pliolite), polyethylene, polyisobutylene and polyvinylacetate. These materials can be used either singly in lieu of the micro-crystalline wax, or they can be employed in conjunction with one or another or with a micro-crystalline wax.

Whatever the material employed to stabilize the aqueous alkyl phenol emulsion, good results have been obtained by using from about 0.5 to 15% of the stabilizer, based on the weight of alkyl phenol present. A preferred range is from about 2 to 10%.

The emulsions of the present invention, in addition to the alkyl phenol and a micro-crystalline wax or other stabilizer, also contain one or more emulsifying agents, and optionally one or more additional stabilizing agents. The emulsifying agent component of the system, which is present in the amount of from about 0.5 to 20%, based on the weight of the alkyl phenol, can be selected from a wide variety of available anionic, cationic, or non-ionic materials. Representative emulsifying agents are sodium oleate, sodium stearate, ammonium oleate, triethanolamine stearate, monoethanolamine stearate, ammonium laurate, sodium or potassium salts of tall oil or rosin, the various high molecular weight amines and amine salts as well as quaternary ammonium salts, salts of sorbitan with a fatty acid, polyoxy ethylene sorbitan monooleate, and sorbitan trioleate.

In case it is desirable to employ an emulsion stabilizer in addition to the micro-crystalline wax or other stabilizer composition described above, the same can be selected from available materials such as sodium salts of polymerized alkyl-aryl sulfonates, albumins, sodium alginates and casein.

The emulsions of the present invention are preferably formed by heating the alkyl phenol component and dissolving the wax or other stabilizer materials employed therein together with the emulsifying agent or agents employed. Following this step, the water phase, preferably heated, is slowly added to the other components of the emulsion with stirring. The emulsion can then be cooled as rapidly as desired without any effect upon its stability. In some cases the resulting emulsions exhibit thixotrophy and will gel on standing. However, mild agitation restores the mixture to the desired fluid condition. The size of the particles present in the emulsion is to a great extent dependent on the degree of shearing employed during the early part of the preparation when the mixture is in the form of a water-in-oil emulsion. By employing an apparatus having a high stirring speed, particles having the desired fine size can more readily be obtained. The strength of the emulsion can be varied within wide limits, and good results have been obtained in the case of emulsions containing from 0.5 to 50 parts by weight of non-aqueous components per 100 parts by weight of water.

The stabilized alkyl phenol emulsions can be employed, for example, by adding the same to an aqueous suspension of a wood or other pulp either with or without a sizing composition. In the case where an anionic emulsifying agent is employed, the emulsified alkyl phenol particles can be deposited on the pulp (along with the size, if present) by the addition of conventional precipitating agents, as paper-makers alum, for example. When a cationic emulsifying agent is used, no precipitant is required. Alternately, the paper or other materials formed from a pulp can be immersed in the aqueous emulsion of alkyl phenol, the latter then remaining in the product as the water present therein is evaporated. When the emulsions are employed in aqueous base paints or rubber latices, the stable emulsions can simply be added in the desired proportion to the rubber or paint composition.

The process of the invention is illustrated by the following examples.

*Example I*

In this operation 95 parts of 2,6-ditertiarybutyl-4-methylphenol were heated to a temperature of about 90° C. and blended at that temperature with five parts of Petrolite 1035 wax and 10 parts of triethanol amine oleate, the mixture fusing to form a homogenous melt. Thereafter, 3.75 parts of Daxad 11 (a sodium salt of condensed alkyl-aryl sulfonates, a product of Dewey & Almy Chemical Company) were dissolved in 375 parts of water at approximately 90° C., after which the resulting solution was slowly added to the hot, wax-containing melt with vigorous stirring. The resulting emulsion, on being cooled to room temperature, was found to be entirely stable. While it formed a gel on standing for a period of one week (due to thixotropic action), mild agitation at once restored the gel to the desired fluid emulsion condition. In duplicating this procedure, but without the use of Daxad 11, the thixotropic condition was observed to occur after one or two days standing, though here again, stirring quickly re-established the desired fluid emulsion condition. This emulsion was then added to Kraft beaten pulp, containing 2.5% rosin size, in a beater engine in an amount sufficient to provide 0.5% of the 2,6-ditertiarybutyl-4-methyl phenol, based on the weight of dry pulp. Addition of paper-makers alum precipitated on the fibers substantially all of the 2,6-ditertiarybutyl-4-methyl phenol and wax present, along the size.

In two companion operations conducted under the same conditions as described above (including the use of Daxad 11), but with the Petrolite wax being omitted in one operation and with 5 parts of a conventional paraffin wax (M. P. 122–125° F. and containing over 90% straight chain hydrocarbons) being substituted for a like amount of Petrolite wax in the other operation, it was found that the crystalline particles originally present in the emulsion rapidly increased in size, with the result that substantially all of the 2,6-ditertiarybutyl-4-methylphenol rapidly settled out of the emulsion. In the case where no wax was present this setting occurred within a period of about 30 minutes, and it was complete in about 90 minutes in the case of the paraffin wax-containing emulsion. In neither case, despite vigorous stirring, could the desired emulsified condition be restored.

*Example II*

This operation was conducted under the same conditions as described in Example I, the first paragraph, except that 2.5 parts of Armeen T (a product of Armour & Co. made up of $C_{16}$—$C_{18}$ alkyl amines) and 2.5 parts of Armac CD (an Armour & Co. product made up of the acetate salts of mixed $C_8$—$C_{18}$ amines) were employed in lieu of the 10 parts of triethanol amine oleate, and the Daxad 11 component was omitted. It was found that the emulsion prepared in this operation was entirely stable and did not break or otherwise deteriorate on being stored for many weeks. It exhibited no thixotropic effect. On the other hand, in companion operations conducted under the same conditions but, in one case, with 5 parts of paraffin wax (M. P. 122–124° F.) being substituted for the Petrolite wax, and in the other case with no wax being employed, it was found that the initial emulsive condition was quickly lost. The paraffin wax-containing system settled out at the end of about two hours, whereas that which contained no wax at all settled in an even shorter period.

*Example III*

A mixture of 95 parts 2,6-ditertiarybutyl-4-methylphenol, 5 parts Petrolite 1035 wax, 10 parts Tween 80 (polyoxy ethylene sorbitan monooleate, a product of the Atlas Powder Company) and 10 parts of Span 80 (sorbitan moncoleate, a product of Atlas Powder Company) were heated together to form a homogenous melt. Thereafter, 3.75 parts of Daxad 11 were dissolved in 375 parts of water at approximately 90° C., after which the water solution was slowly added to the hot wax-containing melt with vigorous stirring. There was produced in this fashion an emulsion which proved to be entirely stable even when stored for many weeks. This emulsion exhibited no thixotropic effect. When this procedure was repeated without the use of any Daxad 11, there was also obtained a stable emulsion of satisfactory character.

In companion operations conducted under the same conditions as described in the foregoing paragraph, but with the Petrolite wax being replaced by a like amount of paraffin wax in the one case, and with no wax being employed in the other, the emulsified material quickly settled out. When no wax was present, settling was complete after one hour, whereas a somewhat longer settling period (about two hours) was experienced in the case of the paraffin-containing system.

*Example V*

A series of runs was made wherein the procedure outlined in Example III, the first paragraph, was followed. In the first of these runs, the Petrolite wax was replaced by 2 parts of high molecular weight polystyrene (a product of Dow Chemical Company); in the second, the Petrolite wax was replaced by 5 parts of polyethylene having a molecular weight of about 2,000 (Alathon, A, a product of E. I. du Pont de Nemours & Co., Inc.); and in the third, the Petrolite wax was replaced by 5 parts of ester gum. In each case there was obtained a stable aqueous emulsion having satisfactory performance characteristics when employed in the treatment of paper pulps and for various other uses.

The invention claimed is:

1. In a method for providing a stable emulsion of an alkyl phenol, the step comprising dispersing said alkyl phenol in an aqueous dispersing medium in the presence of from about 0.5 to 20% emulsifying agent and from about 0.5 to 15% of at least one water-insoluble, heat-fusible solid selected from the group consisting of micro-crystalline waxes and high molecular weight hydrocarbon polymers of styrene, butadiene-styrene, ethylene and isobutylene, said percentages being in terms of the weight of alkyl phenol present.

2. In a method for providing a stable emulsion of an alkyl phenol, the step comprising dispersing said alkyl phenol in an aqueous dispersing medium in the presence of from about 0.5 to 20% emulsifying agent and from about 0.5 to 15% micro-crystalline wax, said percentages being in terms of the weight of alkyl phenol present.

3. In a method for providing a stable emulsion of an alkyl phenol, the step comprising dispersing said alkyl phenol in an aqueous dispersing medium in the presence of from 0.5 to 20% emulsifying agent and from about 2 to 10% micro-crystalline wax, said percentages being in terms of the weight of alkyl phenol present.

4. In a method for providing a stable emulsion of a polyalkyl phenol, the step comprising dispersing said polyalkyl phenol in an aqueous dispersing medium in the presence of from about 0.5 to 20% emulsifying agent and from about 0.5 to 15% micro-crystalline wax, said percentages being in terms of the weight of polyalkyl phenol present.

5. The method of claim 4 wherein the polyalkyl phenol is 2,6-ditertiarybutyl-4-methyl phenol.

6. A composition capable of being dispersed in water to form an emulsion therewith, said composition comprising an alkyl phenol together with from about 0.5 to 20% emulsifying agent and from about 0.5 to 15% micro-crystalline wax, said percentages being based on the weight of alkyl phenol present.

7. The composition of claim 6 wherein the alkyl phenol is 2,6-ditertiarybutyl-4-methyl phenol.

8. A water-oil emulsion containing, as the non-aqueous component, alkyl phenol together with from about 0.5 to 15% micro-crystalline wax and from about 0.5 to 20% emulsifying agent, said percentages being in terms of the weight of alkyl phenol present.

9. A water-oil emulsion containing, as the non-aqueous component, polyalkyl phenol together with from about 0.5 to 15% micro-crystalline wax and from about 0.5 to 20% emulsifying agent, said percentages being in terms of the weight of polyalkyl phenol present.

10. The emulsion of claim 9 wherein the polyalkyl phenol is 2,6-ditertiarybutyl-4-methyl phenol.

References Cited in the file of this patent

UNITED STATES PATENTS

| | | |
|---|---|---|
| 2,069,294 | Wilson | Feb. 2, 1937 |
| 2,090,629 | Hiers et al. | Aug. 24, 1937 |
| 2,346,124 | Dew | Apr. 4, 1944 |
| 2,467,708 | Sturgis | Apr. 19, 1949 |
| 2,528,769 | McCraken | Nov. 7, 1950 |
| 2,625,491 | Young et al. | Jan. 13, 1953 |
| 2,662,061 | Gilcrease et al. | Dec. 8, 1953 |